(12) United States Patent
Huang et al.

(10) Patent No.: US 7,898,972 B2
(45) Date of Patent: Mar. 1, 2011

(54) AUXILIARY CODING FOR HOME NETWORKING COMMUNICATION SYSTEM

(75) Inventors: Gang Huang, Highlands, NJ (US); Zhenyu Wang, Morganville, NJ (US); Jinguo Yu, Manalapan, NJ (US)

(73) Assignee: Agere Systems Inc., Allentown, PA (US)

( * ) Notice: Subject to any disclaimer, the term of this patent is extended or adjusted under 35 U.S.C. 154(b) by 1127 days.

(21) Appl. No.: 10/046,749

(22) Filed: Jan. 17, 2002

(65) Prior Publication Data

US 2003/0133439 A1    Jul. 17, 2003

(51) Int. Cl.
*H04L 12/26* (2006.01)

(52) U.S. Cl. ......... 370/252; 370/229; 370/230; 375/229; 375/231

(58) Field of Classification Search ............ 370/229, 370/230, 231, 252; 375/229, 230, 231, 261, 375/272, 279, 303, 308
See application file for complete search history.

(56) References Cited

U.S. PATENT DOCUMENTS

| | | | |
|---|---|---|---|
| 4,621,366 A * | 11/1986 | Cain et al. | 375/222 |
| 5,930,267 A * | 7/1999 | Daneshrad et al. | 370/509 |
| 5,995,499 A * | 11/1999 | Hottinen et al. | 370/337 |
| 6,169,903 B1 * | 1/2001 | Dorenbosch et al. | 455/458 |
| 6,341,224 B1 * | 1/2002 | Dohi et al. | 455/522 |
| 6,421,527 B1 * | 7/2002 | DeMartin et al. | 455/67.13 |
| 6,483,866 B1 * | 11/2002 | Suzuki | 375/149 |
| 6,546,025 B1 * | 4/2003 | Dupuy | 370/509 |
| 6,574,247 B1 * | 6/2003 | Baggen et al. | 370/528 |
| 6,731,618 B1 * | 5/2004 | Chung et al. | 370/328 |
| 6,847,287 B1 * | 1/2005 | Stottlemyre et al. | 340/5.71 |
| 6,853,681 B1 * | 2/2005 | Lindoff | 375/231 |

(Continued)

FOREIGN PATENT DOCUMENTS

JP       2001-36497       2/2001

OTHER PUBLICATIONS

"Interface Specification for HomePNA™ 2.0 10M8 Technology" HomePNA Confidential, Dec. 1, 1999, Version 2.0, pp. 1-77.

*Primary Examiner* — Kwang B Yao
*Assistant Examiner* — Nguyen Ngo
(74) *Attorney, Agent, or Firm* — Mendelsohn, Drucker & Associates, P.C.; Edward J. Meisarosh; Steve Mendelsohn

(57) ABSTRACT

Advance training information is provided to a receiving Home network station via auxiliary coding, synchronized and/or included in the relevant Ethernet type packet. The advance training information may be, e.g., past equalizer, timing recovery circuit, AGC circuit, echo canceler values resulting from the reception of a previous frame. The training information may be, e.g., an early identity of the source of the packet, with a subsequent lookup performed by the receiving station for predetermined training value(s), or the training values themselves may be transmitted to the home network receiver via auxiliary coding. The auxiliary coding information may be transmitted before and/or during the frame training period of the relevant frame. This permits use of predetermined training values specific to the particular transmitter based on past frames received from that same transmitter during the training period for the received signal to be further refined from that determined from the auxiliary coding, resulting in more efficient and more accurate training of, e.g., a receiving equalizer, time recovery circuits, AGC, echo canceler, etc. Exemplary auxiliary coding techniques include, e.g., BPSK, FSK, QAM.

36 Claims, 14 Drawing Sheets

U.S. PATENT DOCUMENTS

| | | |
|---|---|---|
| 6,882,634 B2 * | 4/2005 | Bagchi et al. ............... 370/338 |
| 6,925,105 B1 * | 8/2005 | Partyka ...................... 375/133 |
| 6,950,433 B1 * | 9/2005 | Okamoto ..................... 370/392 |
| 7,085,248 B1 * | 8/2006 | Holma et al. ................ 370/329 |
| 7,158,785 B1 * | 1/2007 | Ghirnikar et al. .......... 455/435.1 |
| 7,200,103 B2 * | 4/2007 | Chan et al. .................. 370/204 |
| 7,499,397 B1 * | 3/2009 | Monk et al. ................ 370/230.1 |
| 2002/0016949 A1 * | 2/2002 | Goslin et al. ................... 716/4 |
| 2002/0075947 A1 * | 6/2002 | Lai et al. ...................... 375/219 |
| 2002/0118635 A1 * | 8/2002 | Nee ............................... 370/210 |
| 2002/0131486 A1 * | 9/2002 | Haartsen ...................... 375/229 |
| 2002/0155850 A1 * | 10/2002 | Haartsen ...................... 455/502 |
| 2002/0173864 A1 * | 11/2002 | Smith ........................... 700/94 |
| 2003/0039242 A1 * | 2/2003 | Moore, Jr. .................... 370/354 |
| 2003/0048839 A1 * | 3/2003 | Beale et al. .................. 375/229 |
| 2003/0086373 A1 * | 5/2003 | Kronz ........................... 370/235 |
| 2003/0123400 A1 * | 7/2003 | Kloos et al. .................. 370/317 |
| 2005/0186933 A1 * | 8/2005 | Trans ............................ 455/296 |

* cited by examiner

| STATION | EQUALIZER PRE-TRAIN VALUE | TIMING RECOVERY PRE-TRAIN VALUE | AGC PRE-TRAIN VALUE | CORE CONTROLLER PRE-TRAIN VALUE |
|---|---|---|---|---|
| 1234 | 7 | 90,215 | 5 dB | 2.2 |
| 4321 | — | — | 4 dB | — |
| | | ... | | |

FIG. 2

| FIELD | BIT NUMBER | BITS | DESCRIPTION |
|---|---|---|---|
| FT | 31:24 | 8 | Frame Type. This field shall be set to zero by the transmitter. The receiver shall decode this field and discard the frame if it's anything other than zero. |
| RSVD | 23 | 1 | Reserved. This field shall be set to zero by the transmitter, and the receiver shall ignore it. |
| PRI | 22:20 | 3 | Priority (0-7) |
| SI | 19:16 | 4 | Scrambler Initialization |
| PE | 15:8 | 8 | Payload Encoding |
| HCS | 7:0 | 8 | Header Check Sequence |

FIG. 14

AUXILIARY CODING FOR HOME NETWORKING COMMUNICATION SYSTEM

BACKGROUND OF THE INVENTION

1. Field of the Invention

This invention relates generally to telephone devices. More particularly, it relates to a home networking communication system for networking computers within a small environment such as a home.

2. Background of Related Art

There has been an explosive growth in the use of telephone lines in many households, driven largely by the need for simultaneous Internet access, voice communications, networking, etc. Many households and small business are already wired with a telephone line, providing the basis for a convenient wired network.

The HomePhoneline Networking Alliance (HomePNA) is an association of leading companies working together to help ensure adoption of a single, unified phoneline networking industry standard and rapidly bringing to market a range of interoperable home networking solutions. With homenetworking, households receive the benefits of simultaneous, shared internet access, printer/peripheral sharing, file and application sharing, and networked gaming. In addition, consumers can enjoy the use of each of these home entertainment and information services using existing wiring in the home.

Home PNA 2.0 offers several advantages over older technologies. Like the first-generation PNA, it uses your existing phone lines, but it can operate at speeds up to 32 Mbps. Unlike Ethernet, Home PNA doesn't require a hub; each PC simply connects to the nearest telephone jack, but doesn't interfere with the phone's normal operation.

A home networking system is a communication system used to link home personal computers and home electronic appliances together. The media of the link may be, e.g., telephone line, power line or wireless media. The protocol may be, e.g., Ethernet or other LAN (local area network).

An exemplary home networking system 600 is illustrated in FIG. 9 linking, e.g., a first PC 602, a washer 604, a dryer 606, a second PC 608, a stove 610, a video 612, and an audio device 614.

Currently, as many as five (or more) services may co-exist on a single copper pair (i.e., telephone line). They are voice band service (POTS), ISDN service, ADSL service, HPNA (Home Phone line Network Alliance) service and VDSL service. HPNA exists within a home on an internal copper pair, the other services are delivered to the home on an external copper pair.

FIG. 10 shows a conventional distribution of spectral regions typically used for various services, e.g., voice services, xDSL services such as ADSL and g.Lite or G.922.2, and of a home network such as HPNA.

As shown in FIG. 10, a single telephone line is shared such that the various services co-exist as a type of FDM (Frequency Division Multiplex) system. In this arrangement, Plain Old Telephone Service (POTS) exists in the 0-4 kHz region, an exemplary xDSL service may be present from 25 kHz to approximately 2.2 MHz (depending on the definition of "x"), and the HPNA spectrum occupies 5.5-9.5 MHz for HPNA V1.x technology or 4.25-9.75 MHz for the emerging V2.x technology.

FIG. 11 depicts the HPNA description of a conventional HPNA compliant transmitter which generates a physical layer (PHY) signal.

In particular, as shown in FIG. 11, an HPNA transmitter 800 consists of a frame processor 802, a data scrambler 804, a bit-to-symbol mapper (i.e., constellation encoder) 806, and a QAM (e.g., FDQAM) modulator 808.

The output of the HPNA transmitter 800 is a 4 MBaud quadrature amplitude modulation (QAM) and 2 MBaud Frequency Diverse QAM (FDQAM), with 2 to 8 bits-per-Baud constellation encoding, resulting in a physical layer payload modulation rate that ranges from 4 Mb/s to 32 Mb/s. Information is transmitted on the HPNA channel in bursts, or frames.

FIG. 12 shows the HPNA2.x standard frame 900, which is based on telephone line and Ethernet protocol.

In particular, FIG. 12 shows exemplary conventional Home PNA network packet frames 900a, 900b, including a training sequence (TRN) 902a, 902b, a head portion (HEAD) 904a, 904b, and a data payload (DATA) 906a, 906b.

The training sequence (TRN) 902 is a predefined preamble (e.g., 64 symbols) in each Home PNA network packet frame 900. The header (HEAD) 904 includes information relating to the source and destination addresses, and the Ethernet type. The data payload (DATA) 906 includes the Ethernet compliant data payload and error checking information.

The Home PNA network packet frames 900 are basic information cells transferring data from one Home network station to another. An Inter Frame Gap (IFG) 920 is between each Home PNA network packet frame 900. The IFG 920 relates to the silence (no signal) time between two adjacent Home PNA network packet frames 900.

FIG. 13 shows in more detail the physical layer (PHY) HPNA packet frame format.

In particular, as shown in FIG. 13, each conventional HPNA physical layer frame 900 consists of variable-rate payload information 906 encapsulated by a low-rate header 904 including preamble information 11, and a low-rate trailer 1006. While in the HPNA 2.0 standard the preamble information 11 is defined as being included in the header 904, it is shown separately in FIG. 13 for ease of description herein.

The conventional Home PNA network packet frame format includes an Ethernet compatible sub-frame 930. This allows Home PNA networking systems to be 100% compatible with current Ethernet devices. Moreover, the use of an Ethernet sub-frame 930 allows the use of existing Ethernet protocol chip sets without the need for redesign.

The preamble PREAMBLE64 11 forms a training period which allows a receiver to train appropriate components, e.g., an equalizer, timing recovery, automatic gain control (AGC), an echo canceler, etc. The PREAMBLE64 11 is defined as a repetition of four 16 symbol sequences (TRN16) that result from encoding at 2 Mbaud, 2 bits-per-Baud, with the scrambler 804 (FIG. 11) disabled. The TRN16 is a constant amplitude QPSK sequence, designed to facilitate power estimation and gain control, baud frequency offset estimation, equalizer training, carrier sense, and collision detection.

The header 904 includes frame control information 12, and the initial portion of an otherwise standard Ethernet packet 930. In particular, the header 904 further includes a destination address (DA) 13, a source address (SA) 14, and an Ethernet type 15.

The frame control field 12 of the header 904 is defined as a 32-bit field as shown in FIG. 14. The frame control field 12 consists of, in the following order, a frame type (FT), scrambler initialization bits (SI), priority (PRI), a reserved field (RSVD), payload encoding information (PE), and a header check sequence (HCS). Also in the header 904, the destination address (DA) 13 and the source address (SA) 14 are each 24 symbol values, in accordance with Ethernet standards.

The data payload 906 includes the end portion of the otherwise standard Ethernet packet 930, in particular the Ethernet data 20, a Frame Check Sequence (FCS) 21, a 16-bit cyclic redundancy check (CRC) 21, a pad field (PAD) 22 consisting of a number of octets inserted, and an end-of-frame (EOF) sequence delimiter 23 consisting of the first 4 symbols of the TRN sequence from the preamble 11.

Using this conventional approach to Home networking, a predefined preamble 11 of, e.g., 64 symbols, is required before each Ethernet frame to allow synchronization and reliable reception. For instance, the 64 symbols provide time for the receiver to train appropriate components such as an equalizer, timing recovery, an automatic gain controller (AGC), and an echo canceler. However, because the Home PNA 2.0 is a packetized data standard, the receiver must re-train its components for reception of each Home PNA packet network frame 900. While this is a reasonable approach, it is appreciated by the present inventors to have certain disadvantages.

For instance, the training of the equalizer, timing recovery circuits, AGC, echo canceler, etc. during reception of the preamble is commonly referred to as "blind training", meaning that the receiver station doesn't know any information about the incoming signal before it trains its components during reception of the preamble. Thus, the equalizer must be re-trained from scratch for reception of each Home PNA packet network frame 900. The same for the timing recovery circuits, the AGC, and any echo canceler. Thus, blind training has to accommodate different communication channels and/or different Ethernet types, which significantly impacts performance and/or cost.

While the Home PNA 2.0 standard provides a given amount of time, e.g., 64 symbols worth of time, this time is considered by the present inventors to be short, causing 'quickened' training of the appropriate receiver circuits such as the equalizer, timing recovery, AGC, echo canceler, etc., resulting in limited receiver performance.

Another disadvantage is that in HPNA, the Ethernet type includes different baud rates in the DATA period. For each different baud rate, the optimal equalizer training is completely different. So, in the case of blind training, either multiple equalizers must be used, with each equalizer optimally matching each baud rate (increasing cost), or a single equalizer must be implemented which compromises over the different baud rates ultimately reducing performance.

Yet another disadvantage is that in the Ethernet protocol, two adjacent frames may be completely independent, meaning that the two frames may be transmitted from different stations. Thus, their channel properties may be completely different. In this case, the blind training cannot make use of any pre-determined information or any channel information, thus also limiting performance.

There is a need for a technique in home networking communication that permits frame training in a high performance and cost effective manner.

SUMMARY OF THE INVENTION

In accordance with the principles of the present invention, a method of providing advance information to a receiver in a home network comprises providing auxiliary coding to the receiver, and providing data packets to the receiver. The auxiliary coding is associated with data packets on a packet-by-packet basis.

BRIEF DESCRIPTION OF THE DRAWINGS

Features and advantages of the present invention will become apparent to those skilled in the art from the following description with reference to the drawings, in which:

FIG. 2 shows an exemplary entries in the Home network station pre-training database shown in FIG. 1.

FIG. 14 shows frame control fields in the header of the HPNA frame.

DETAILED DESCRIPTION OF ILLUSTRATIVE EMBODIMENTS

This invention presents a new idea and approaches to overcome the blind frame-training problem for conventional home networking techniques, e.g., such as the one described by the HomePNA2.x standard. In particular, in accordance with the principles of the present invention, advance training information is provided to a receiving Home network station via auxiliary coding, synchronized and/or included in the relevant Ethernet type packet. The advance training information (e.g., training information resulting from the reception of a previous frame) is referred to herein as "Over Frame Training".

The training information may be, e.g., an early identity of the source of the packet, with a subsequent lookup performed by the receiving station for predetermined training value(s), or the training values themselves may be transmitted to the home network receiver via auxiliary coding.

Figure 13:
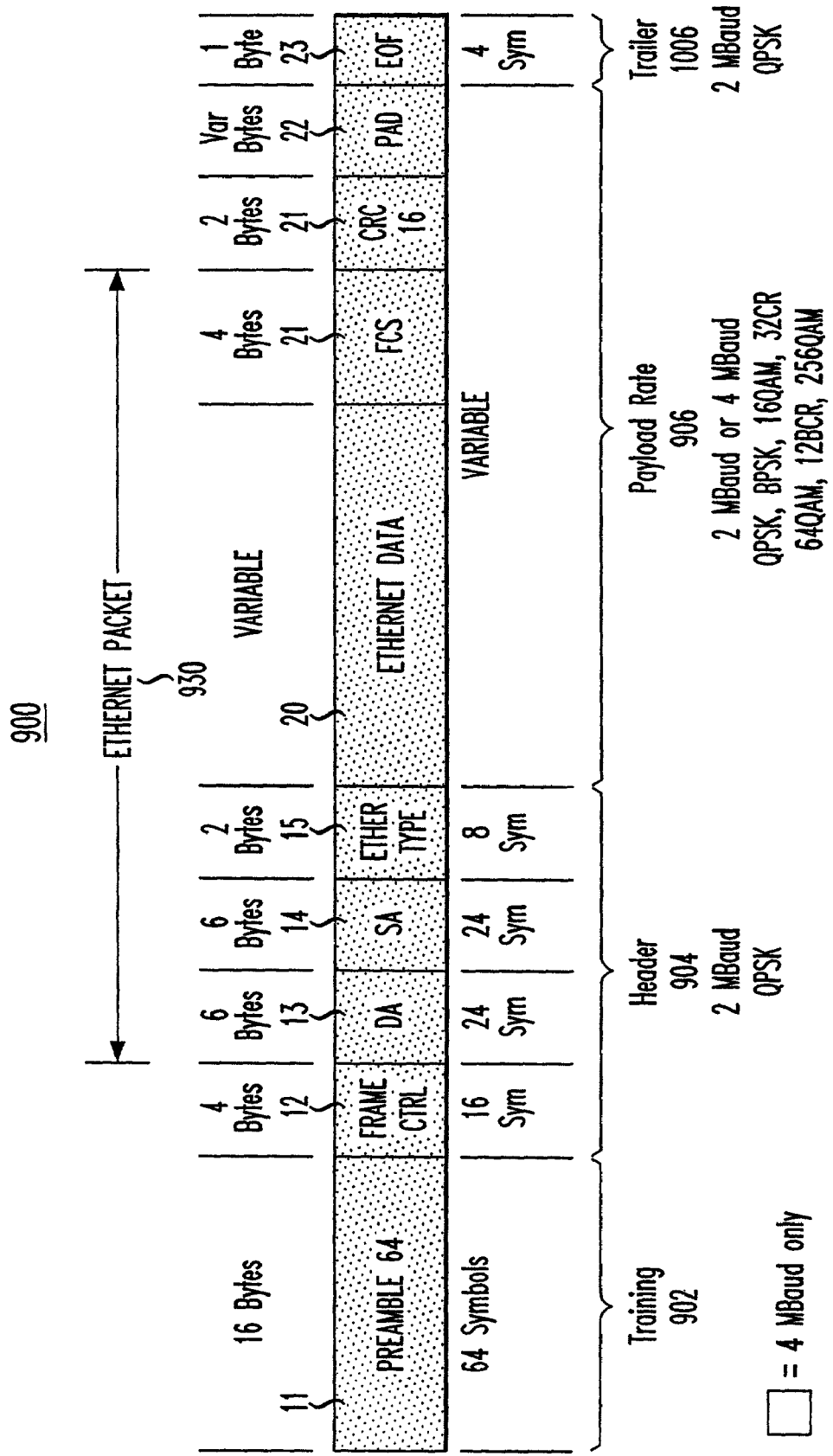
FIG. 13 shows in more detail the physical layer (PHY) HPNA frame format.

The present inventors have appreciated that Ethernet information is inside the HEAD 904 of the Home PNA packet network frame 900, which is received after the period of time used for frame training 902. For instance, as seen in the previously described FIG. 13, the source address SA 14 is not transmitted to the receiving home network device until after the preamble 11, the frame control 12, and the destination address 13. This requires 104 symbols to be transmitted before the source address 14 is begun.

Thus, in conventional Home PNA network systems, a receiving station doesn't know anything about the yet-to-be received data frame until after the training period TRN 902 and significantly into the header information 904.

In accordance with the principles of the present invention, auxiliary coding is used to provide advance information to the receiving home network device sufficient for the home network device to seed one or more trainable components with an appropriate predetermined value (e.g., the trained value for the last frame 900 received from that particular transmitting home network device, a moving average of past frames 900, etc.)

In accordance with various embodiments of the present invention, the auxiliary coding information is transmitted before and/or during the frame training period 902 of the relevant frame 900. This permits use of predetermined training values specific to the particular transmitter based on past frames 900 received from that same transmitter during the training period 902 for the received signal to be further refined from that determined from the auxiliary coding, resulting in more efficient and more accurate training of, e.g., a receiving equalizer, time recovery circuits, AGC, echo canceler, etc.

Thus, with the advance information provided by the inclusion of auxiliary coding as to the source of a current packet frame 900 (or particular training value(s)), frame training on a signal from a transmitting Home network device over a particular radio channel and/or using a particular Ethernet type can be optimized.

Figure 1:
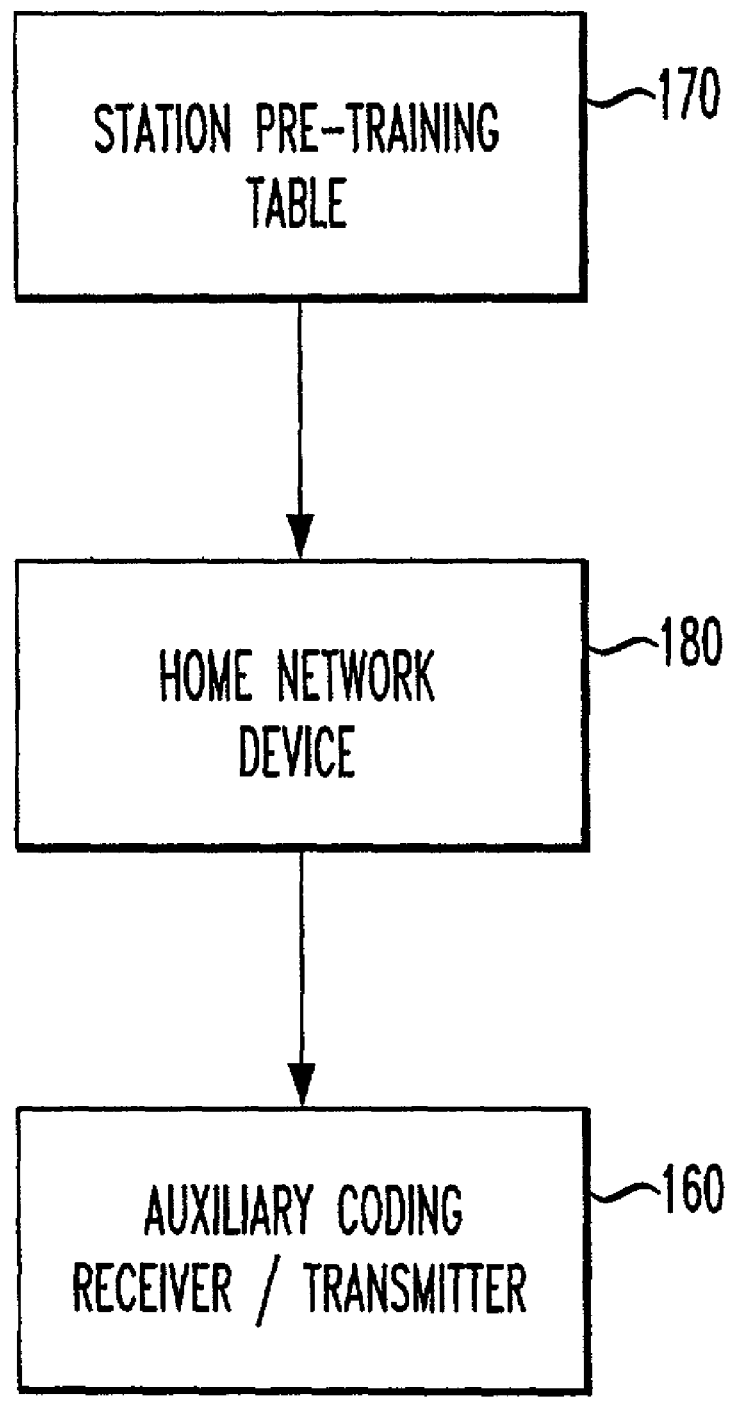
FIG. 1 depicts the relevant portion of a Home PNA network device including an auxiliary coding transceiver and a Home network station pre-training database, in accordance with the principles of the present invention.

FIG. 1 depicts the relevant portion of a Home PNA network device including an auxiliary coding transceiver and a Home network station pre-training database, in accordance with the principles of the present invention.

In particular, FIG. 1 shows the inclusion of an auxiliary coding transceiver 160 and a station pre-training database 170 in association with a home network device 180, in accordance with the principles of the present invention.

FIG. 2 shows an exemplary entries in the Home network station pre-training database shown in FIG. 1.

In particular, FIG. 2 shows a table including a plurality of entries 291-293. Each entry 291-293 relates to an association of predetermined information 204, 206, 208 and/or 210 (e.g., previously performed training results such as from a previous packet received from the associated station 202).

In the disclosed embodiment, the home network device 180 receives a data frame 900 via conventional reception techniques, but also receives auxiliary coding (i.e., a station ID parameter 202) via an auxiliary coding transceiver (though in another embodiment the auxiliary coding may be received via the conventional home network transceiver but inserted into the otherwise fixed PREAMBLE64). Armed with early and quick information regarding the identity of the transmitting home network device, the receiving home network device 180 performs a table look-up in the station pre-training table 170 to determine one or more training values. Exemplary training values include, but are not limited to, an equalizer start value 204, timing recovery start value 206, AGC start value 208, and/or echo canceler start value 210.

Figure 3:
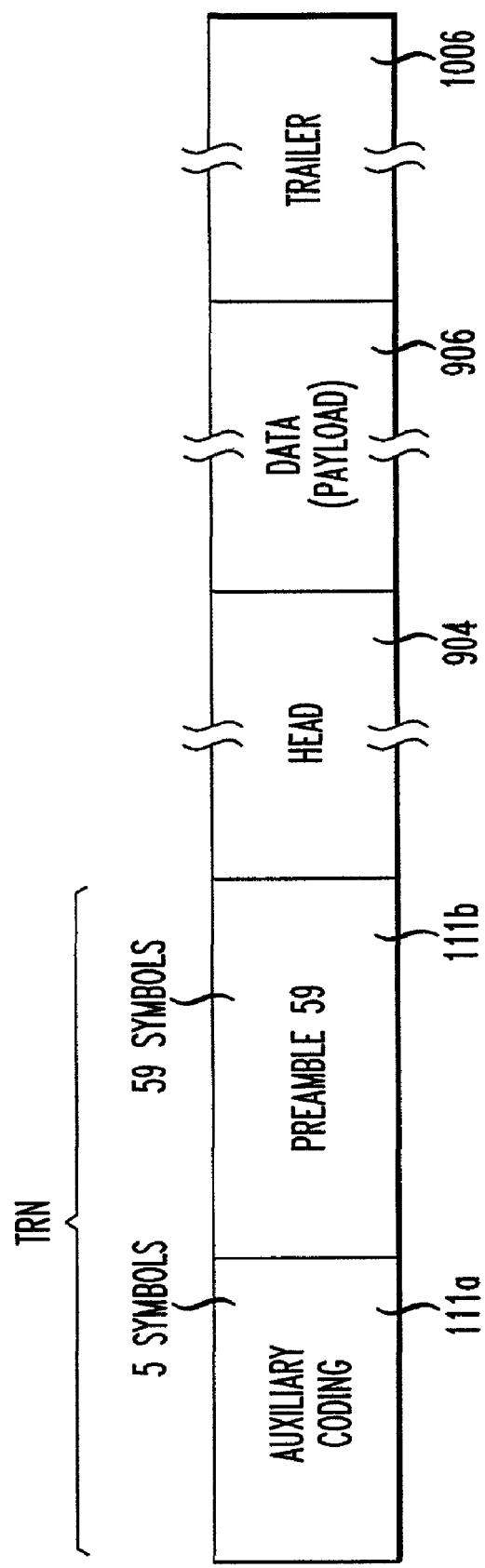
FIG. 3 shows an exemplary insertion of auxiliary coding information into the otherwise conventional training period, together with a shortened preamble, in accordance with one embodiment of the present invention.

FIG. 3 shows an exemplary insertion of auxiliary coding information into the otherwise conventional training period, together with a shortened preamble, in accordance with one embodiment of the present invention.

In particular, FIG. 3 shows the replacement of the otherwise conventional initial symbols (e.g., the first 4 to 5 symbols) of the preamble PREAMBLE64, with auxiliary coding 111*a*, and the use of a shortened fixed preamble PREAMBLE59 111*b*. Otherwise, the remaining portion of the home network packet frame remains as conventionally described by, e.g., Home PNA 2.0.

The auxiliary coding symbols inserted into the training portion TRN may be transmitted at a relatively slow data rate (e.g., 1 bit per symbol), relieving the receiver from the need for a fully trained equalizer, from a fully adjusted timing recovery circuit, etc.

In the disclosed embodiments, only a locally unique identity be transmitted in the auxiliary coding. For instance, 4 bits of information uniquely identifying 16 sources may be sufficient to provide a basis for receiving home network devices to recall previous training information received from the same transmitting home network device.

The auxiliary coding information may include only a local identification (e.g., 4-bit ID) of the transmitting home networking device. The auxiliary coded identification information need not be absolute (i.e., it need not be known that the transmitter is a printer, TV, etc.). Rather, a unique identifier locally defined within only the particular receiving home networking device may be sufficient.

Alternatively, or additionally, the auxiliary coding information may include particular advance information about the source, e.g., the data mode, the baud rate, the full identification of the transmitting station, coding information, etc.

There are many different ways to implement an independent auxiliary coding signal in accordance with the principles of the present invention. For instance, pulse interval modulation can be used.

Figure 4:
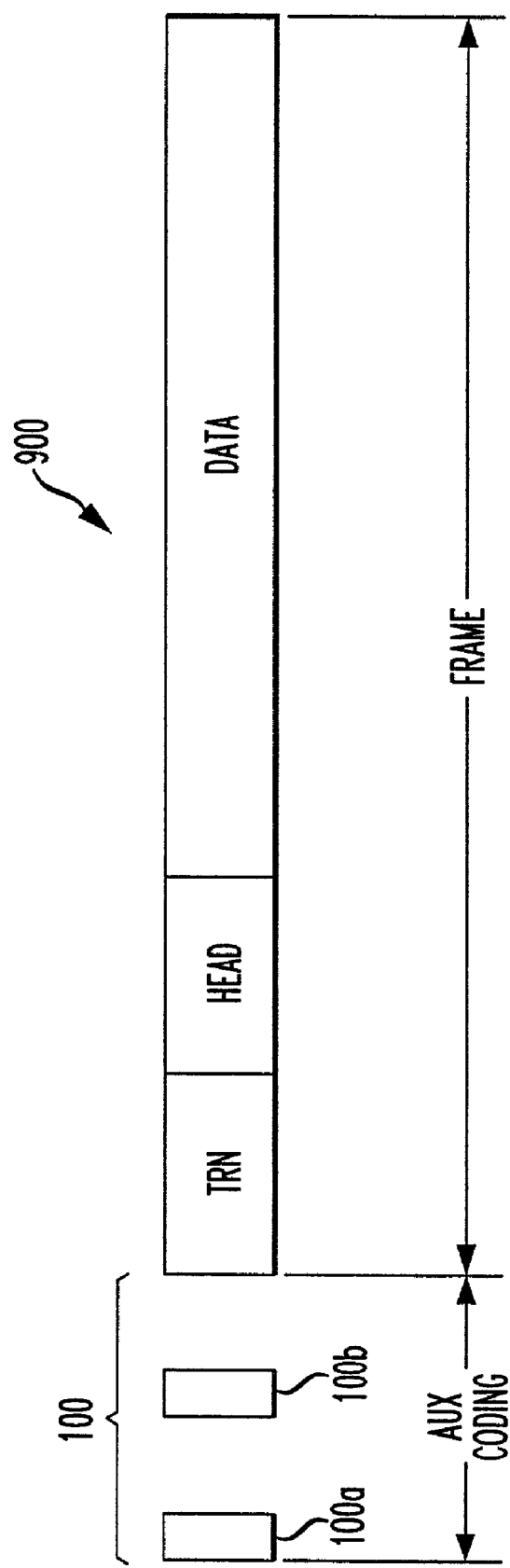
FIG. 4 shows pulse interval modulation for auxiliary coding in accordance with the principles of the present invention.

FIG. 4 shows the use of pulse interval modulation for auxiliary coding in accordance with the principles of the present invention.

In particular, FIG. 4 shows an exemplary auxiliary coding embodiment implementing pulse interval modulation by time division. In the embodiment shown in FIG. 4, the auxiliary coding is provided to the receiving home network device via an independent signal, so it has no conflict with home network packet frame signal. Thus, the home network communication frames remain 100% compatible with current Ethernet protocol, with the additional, proprietary auxiliary coding providing advance information to the receiving home networking device.

Moreover, it is preferred that the frequency bandwidth of the auxiliary coding signal be inside the current home networking frequency bandwidth, so as to retain compatibility with current home network standards (e.g., Home PNA 2.0).

Furthermore, it is preferred that the power level of the auxiliary coding signal follows that of the relevant home network packet frame such that current home network standards (e.g., Home PNA 2.0) remain unaffected.

In the disclosed embodiment, it is preferred that the independent auxiliary coding be synchronized with the relevant home network packet frame.

The pulse interval modulation may be accomplished by adding additional pulses before each frame, and coding the information by varying the timing interval between two adjacent pulses 100*a*, 100*b*.

Preferably, the frequency bandwidth of the pulses 100*a*, 100*b* are the same as or inside the normal frame frequency bandwidth. One way to ensure this is by adding a pulse shaping filter and/or a band pass filter after the pulse generator of the transmitting home network device.

Preferably, the pulse amplitude and/or energy level of the auxiliary coding follows the specification of the relevant or associated home network frames. An example of the pulse is the access ID (AID) pulse, which is defined in the Home PNA 2.x compatibility mode.

The present invention appreciates that although Ethernet standards require 24 symbol long source and destination addresses, local, much shorter source addresses may be utilized to provide advance information as to the local source of an associated data frame.

Figure 5:
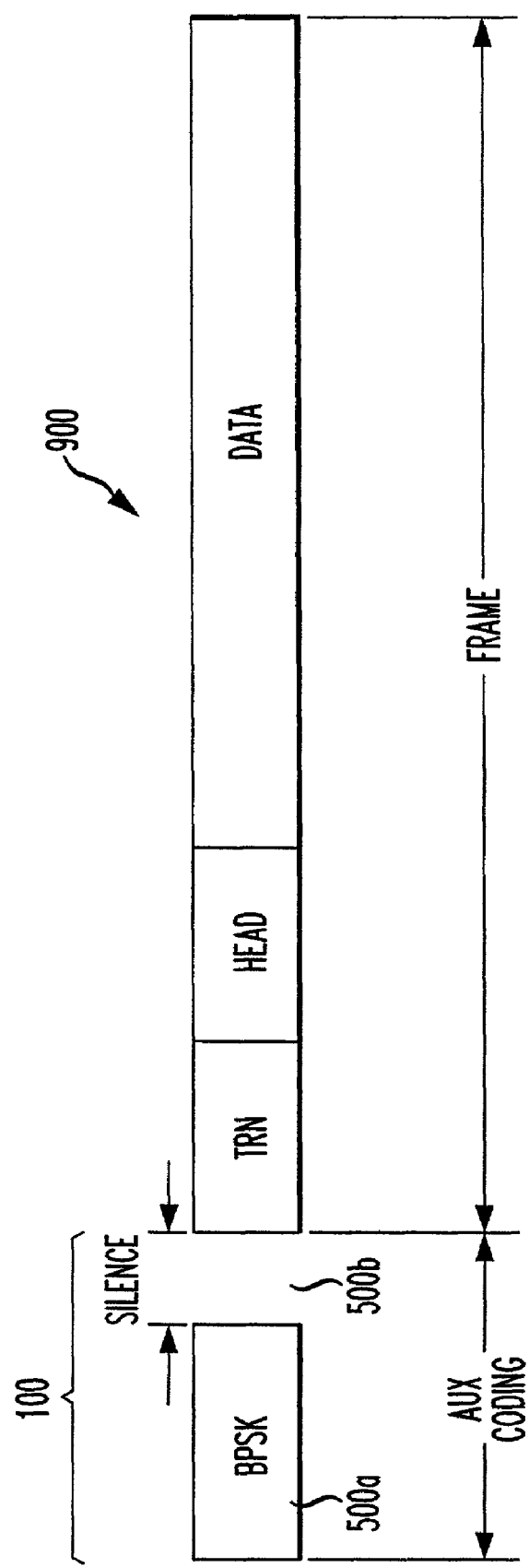
FIG. 5 shows the use of BPSK modulation for auxiliary coding in accordance with the principles of the present invention.

FIG. 5 shows the use of BPSK modulation for auxiliary coding in accordance with the principles of the present invention.

In particular, FIG. 5 shows an exemplary auxiliary coding embodiment implementing auxiliary data (e.g., a local station ID) coded by BPSK (Binary Phase Shift key) modulation by time division. Auxiliary coding is implemented as an additional sequence before the otherwise conventional home network frame. The auxiliary coding sequence may be transmitted by the same radio frequency (RF) front end as is the Home PNA network frame, preferably with a silence period 500*b* inserted between the auxiliary coding (e.g., the BPSK data 500*a*) and the Home network data frame 900. Alternatively, the auxiliary coding sequence may be transmitted by a first RF front end while the network frame is transmitted by a second RF front end different from the first RF front end.

In the disclosed embodiment, it is preferred that the amplitude and frequency band of the auxiliary BPSK coding 500*a* follows the specification of the conventional frame, e.g., Home PNA 2.0.

Figure 6:
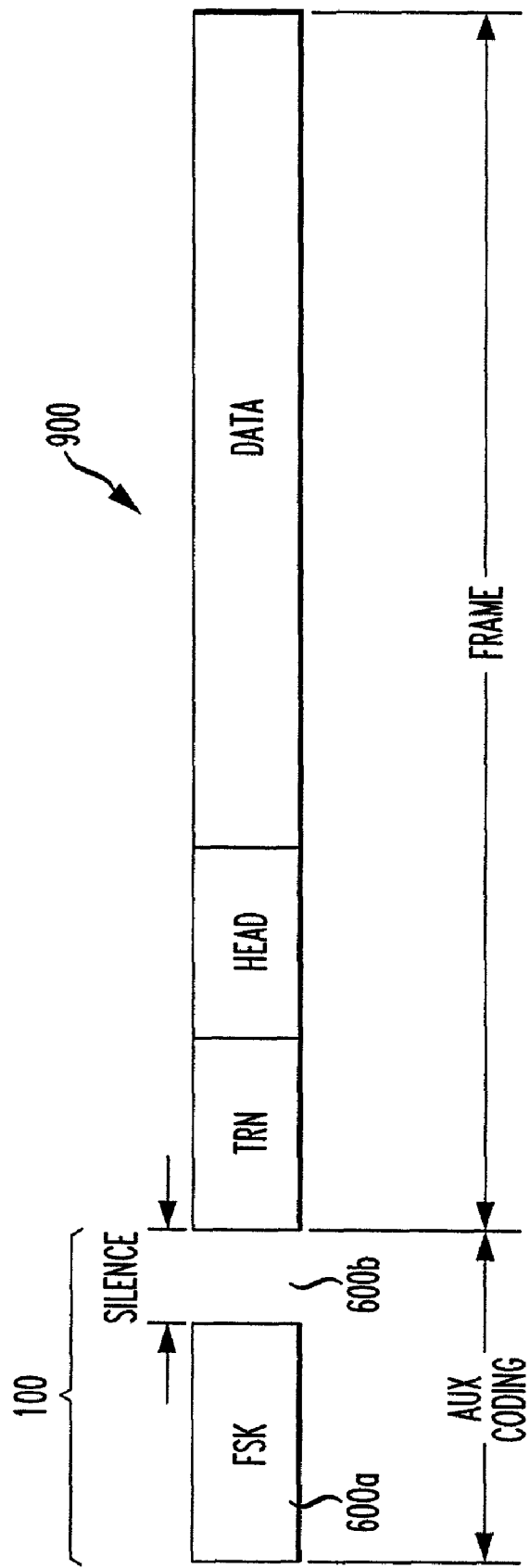
FIG. 6 shows the use of FSK modulation for auxiliary coding in accordance with the principles of the present invention.

FIG. 6 shows the use of Frequency Shift Keying (FSK) modulation for auxiliary coding in accordance with the principles of the present invention.

In particular, FIG. 6 shows an exemplary auxiliary coding embodiment implementing FSK modulation by time division, in place of the BPSK modulation shown in FIG. 5.

Figure 7A:
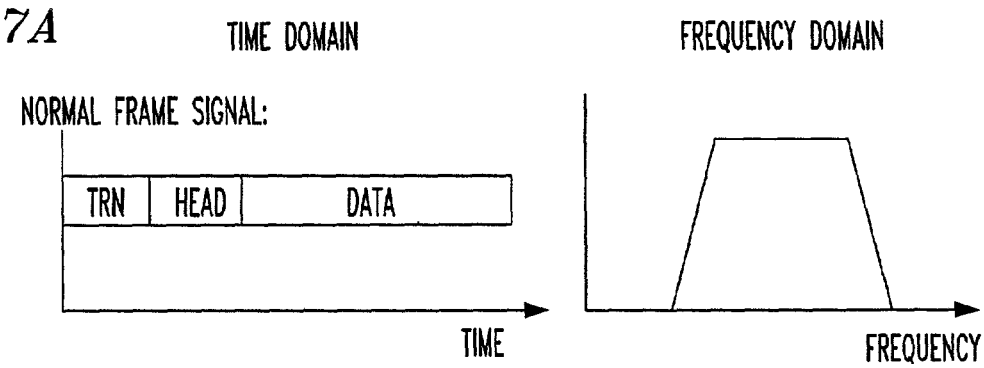
FIGS. 7A to 7C show the implementation of auxiliary coding using FSK modulation in both the time domain and the corresponding frequency domain, in accordance with an embodiment of the present invention.
Figure 7B:
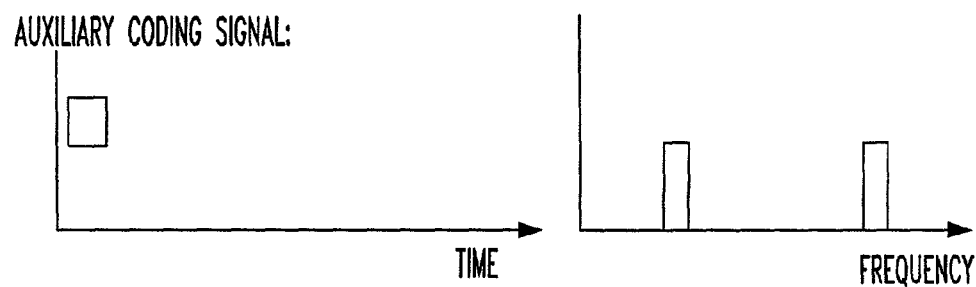
Figure 7C:
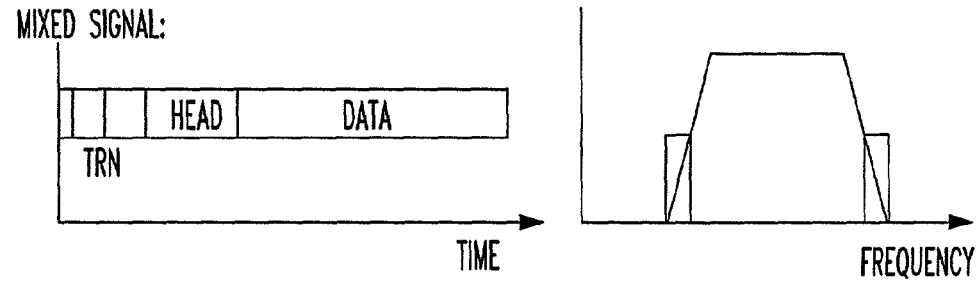

FIGS. 7A to 7C show the implementation of auxiliary coding using FSK modulation in both the time domain and the corresponding frequency domain, in accordance with an embodiment of the present invention.

In particular, FIGS. 7A to 7C show an exemplary auxiliary coding embodiment implementing FSK modulation by frequency division. In FIGS. 7A to 7C, the additional FSK modulated signal 600*a* (FIG. 6) is mixed into the otherwise conventional home network data frame signal. As a result, the FSK frequency of the auxiliary coding 100 is located on the two sides of the normal frame frequency band.

Figure 8A:
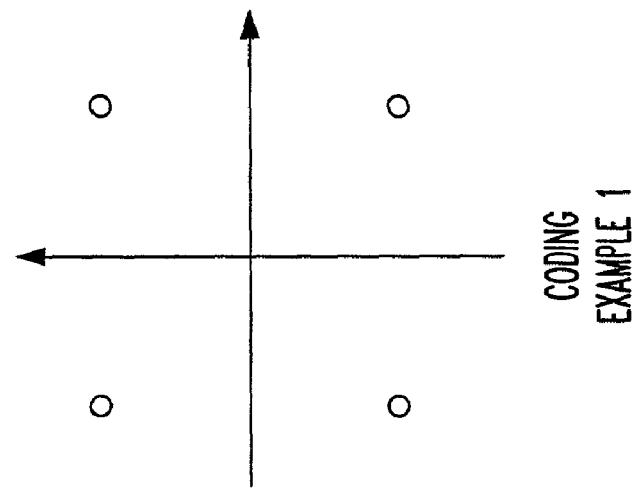
FIGS. 8A to 8C show the implementation of auxiliary coding using Quadrature Amplitude Modulation (QAM) by code division, in accordance with yet another embodiment of the present invention.
Figure 8B:
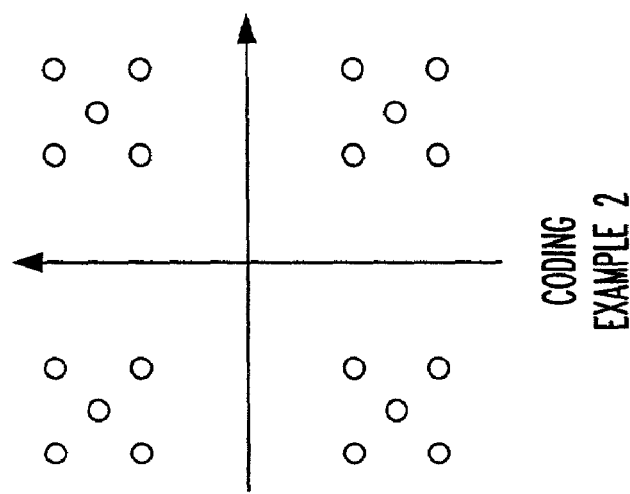
Figure 8C:
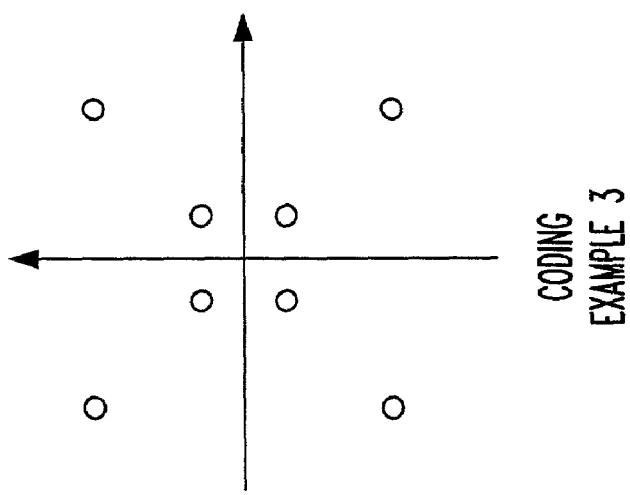
Figure 9:
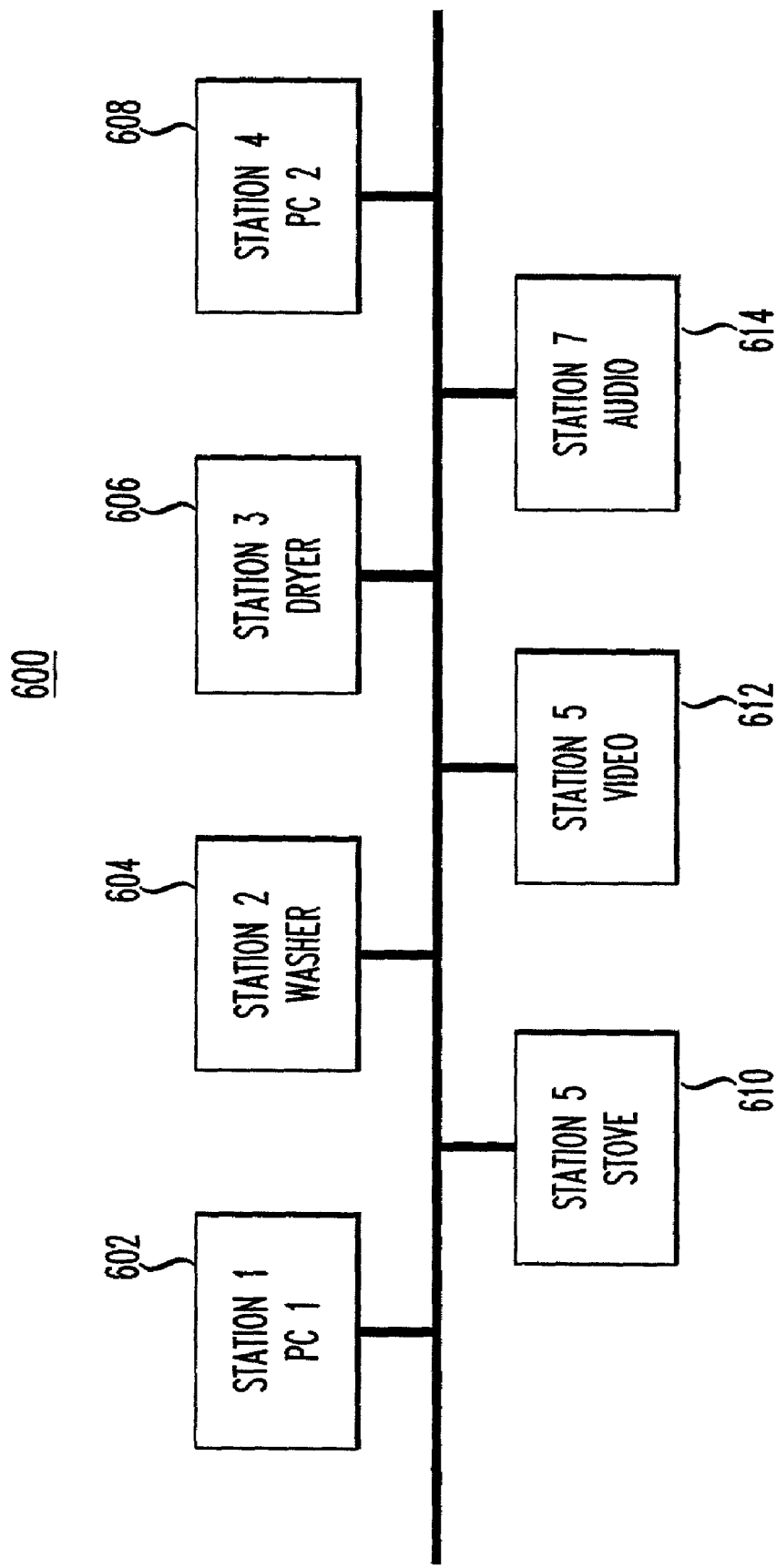
FIG. 9 shows an exemplary block diagram of a conventional home networking system.
Figure 10:
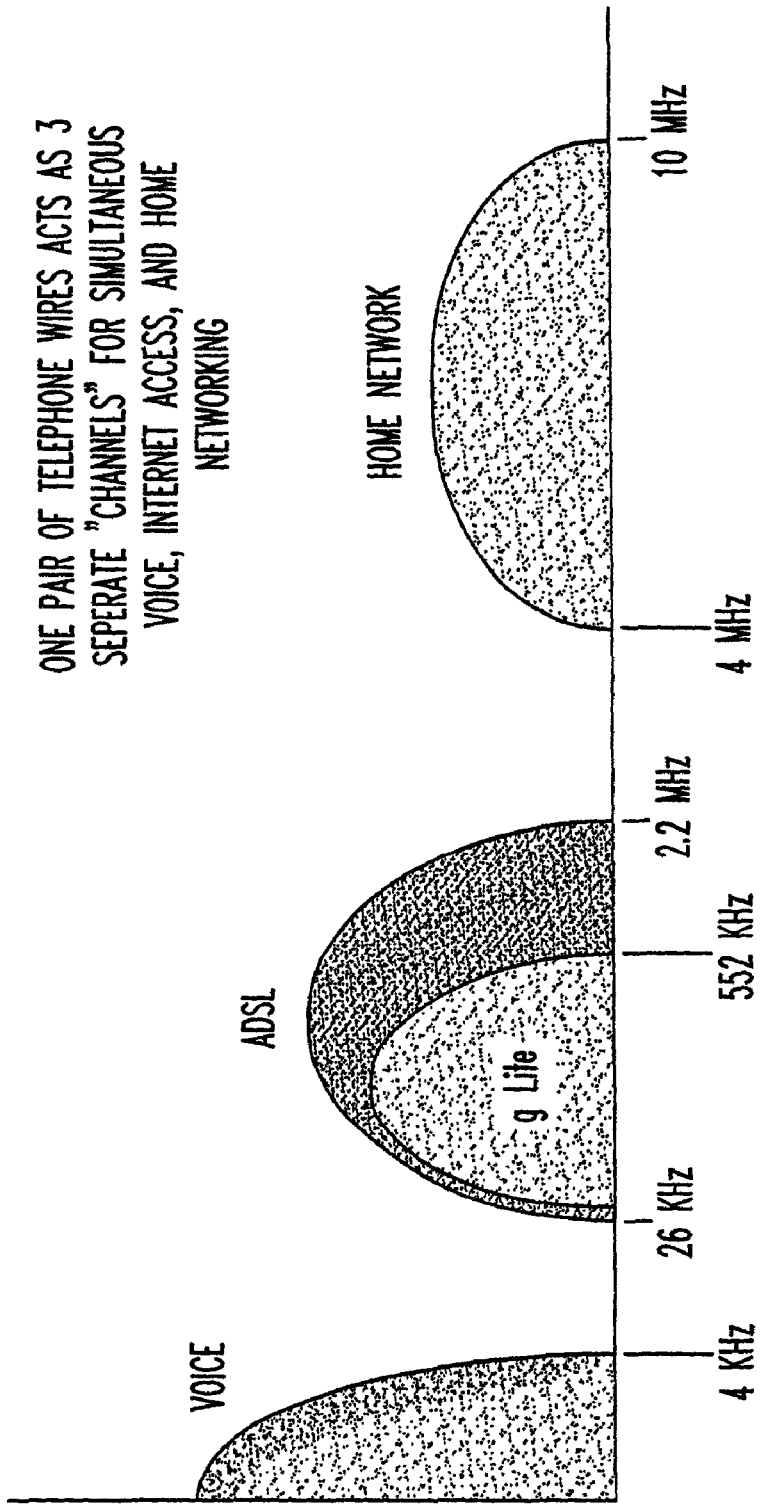
FIG. 10 shows a conventional distribution of spectral regions typically used for various services, e.g., voice services, xDSL services such as ADSL and g.Lite or G.922.2, and of a home network such as HPNA.
Figure 11:
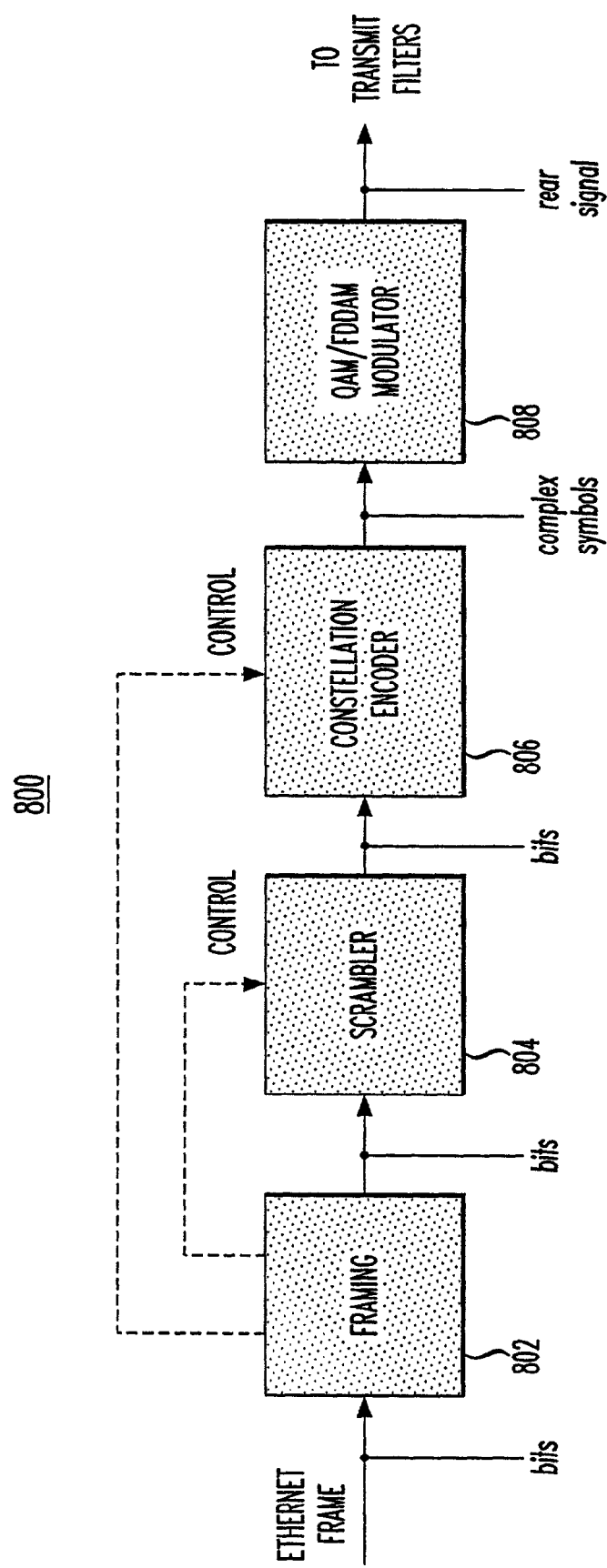
FIG. 11 shows a conventional block diagram of the components of a home networking transmitter.
Figure 12:
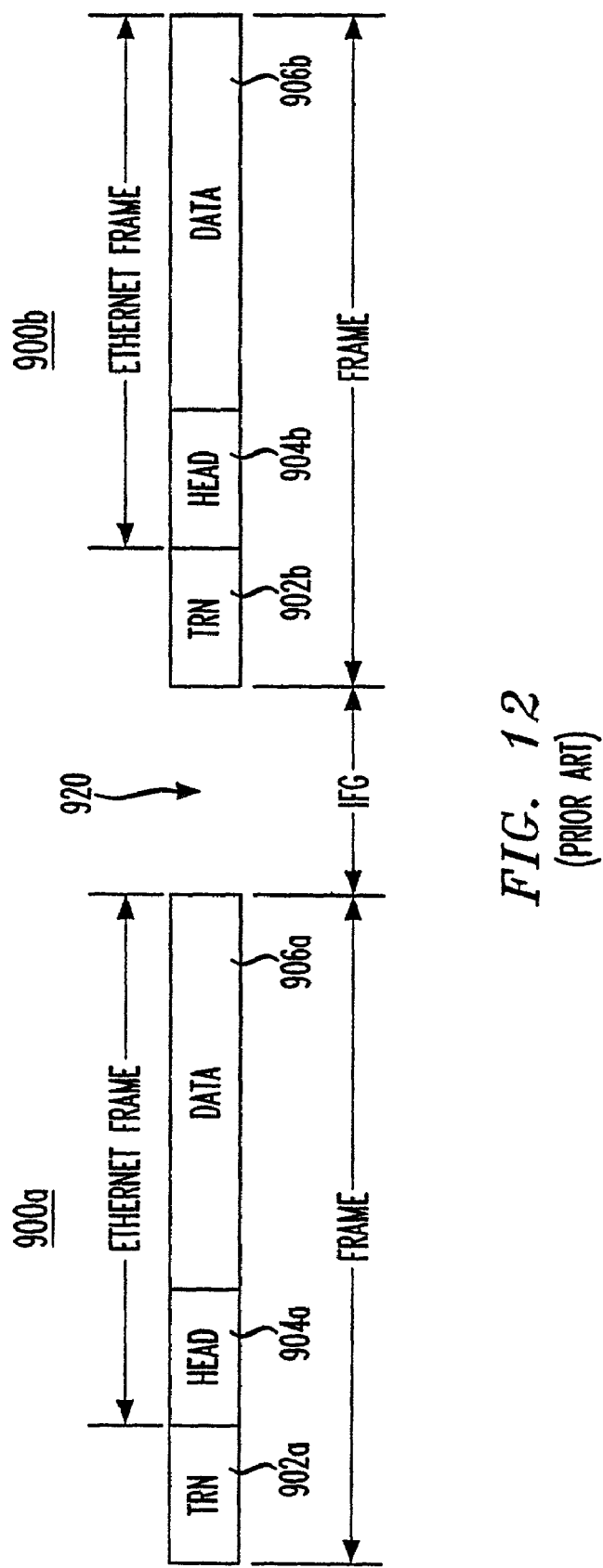
FIG. 12 shows a conventional HPNA frame format.

FIGS. 8A to 8C show the implementation of auxiliary coding using Quadrature Amplitude Modulation (QAM) by code division, in accordance with yet another embodiment of the present invention.

In particular, FIGS. 8A to 8C show QAM modulation by code division. FIGS. 8A to 8C show exemplary coding implementations of redefined preamble sequences including auxiliary coding inside (e.g., as shown in FIG. 3). In accordance with this embodiment, different transmitting home network stations might use different constellations such as those shown in FIGS. 8A to 8C to identify themselves or particular training information.

The baud rate may be increased in the preamble to make room for auxiliary coding information. For example, when the preamble is coded at 2 MBaud, then the auxiliary code may be inserted by coding at 4 MBaud.

One particular advantage provided by the present invention is the ability for faster data rates due in large part to the better training for relevant components. For example, with auxiliary coding in accordance with the principles of the present invention, the equalizer of the receiving home network device may be pre-trained with the trained value from past packets received from the same home network device, allowing additional time to further refine and train on the received signal. The additional time for training the equalizer, timing recovery circuits, etc., leads to the ability to increase the data rate of the signal. For example, the HPNA2.x conforming home network may increase to as much as 30 Mbit/sec from the otherwise conventional 20 Mbit/sec.

While the invention has been described with reference to the exemplary embodiments thereof, those skilled in the art will be able to make various modifications to the described embodiments of the invention without departing from the true spirit and scope of the invention.

What is claimed is:

1. A network device for a communication network, the network device comprising:
    (a) a database table adapted to store one or more sets of one or more parameters, each set corresponding to a different identifier for a corresponding network device of the communication network; and
    (b) a receiver adapted to:
        (1) receive a first data packet from a first transmitter, the first data packet comprising a training sequence, a header, and a payload;
        (2) receive a first auxiliary coding corresponding to only the first data packet, wherein:
            the first auxiliary coding identifies a first identifier;
            the first auxiliary coding is different from the training sequence; and
            the first identifier is different from the training sequence;
        (3) recover the first identifier from the first auxiliary coding;
        (4) retrieve a first set of one or more parameters from the database table based on the first identifier;
        (5) process at least a portion of the first data packet based on the first set of one or more parameters;
        (6) receive a second data packet from a second transmitter, the second data packet comprising a training sequence, a header, and a payload;
        (7) receive a second auxiliary coding corresponding to only the second data packet, wherein:
            the second auxiliary coding identifies a second identifier;
            the second auxiliary coding is different from the second data packet's training sequence;
            the second identifier is different from the second data packet's training sequence;
        (8) recover a second set of one or more parameters from the database table based on the second identifier; and
        (9) process at least a portion of the second data packet based on the second set of one or more parameters.

2. The network device of claim 1, wherein the communication network is a HomePNA network.

3. The network device of claim 1, wherein
the first auxiliary coding and the first data packet's training sequence form the first and second portion, respectively, of the first data packet.

4. The network device of claim 1, wherein:
the first auxiliary coding is encoded using frequency shift keying (FSK) modulation by frequency division;
the first auxiliary coding is encoded at a frequency different from a frequency for the first data packet;
receipt of the first auxiliary coding overlaps in time with receipt of the training sequence of the first data packet.

5. The network device of claim 1, wherein the first auxiliary coding is received before the first data packet is received.

6. The network device of claim 1, further comprising a second transmitter adapted to:
(1) generate a first transmitted auxiliary coding for transmittal with a first transmitted data packet, wherein:
the first transmitted data packet comprises a first transmitted training sequence, a first transmitted header, and a first transmitted payload;
the first transmitted auxiliary coding is different from the first transmitted training sequence;
the first transmitted auxiliary coding identifies a first transmitted identifier;
the first transmitted identifier is different from the first transmitted training sequence;
the first transmitted identifier identifies the second transmitter; and
the first transmitted auxiliary coding is different from the first transmitted training sequence;
(2) transmit the first transmitted auxiliary coding and the first transmitted data packet to a second network device.

7. The network device of claim 6, wherein:
the second transmitter comprises a first RF front end; and
the second transmitter is adapted to transmit both the first transmitted auxiliary coding and the first transmitted data packet using the first RF front end.

8. The network device of claim 6, wherein:
the second transmitter comprises a first RF front end and a second RF front end;
the second transmitter is adapted to transmit the first transmitted auxiliary coding using the first RF front end; and
the second transmitter is adapted to transmit the first transmitted data packet using the second RF front end.

9. The network device of claim 1, wherein the first auxiliary coding comprises five or fewer symbols.

10. The network device of claim 1, wherein the first auxiliary coding comprises five or fewer bits.

11. The network device of claim 1, wherein the first identifier is a station identifier that uniquely identifies the first transmitter within the communication network.

12. The network device of claim 11, wherein:
the first data packet header includes a source address for the first transmitter; and
the first identifier is not the same as the source address for the first transmitter.

13. The network device of claim 1, wherein the first set of one or more parameters comprises at least one of a receiving-equalizer start value, a timing-recovery start value, an automatic-gain-controller start value, and an echo-canceller start value.

14. The network device of claim 1, wherein the first set of one or more parameters is based on moving averages, from past data packets received from the first transmitter, of one or more of a receiving-equalizer value, a timing-recovery value, an automatic-gain-controller value, and an echo-canceller value.

15. The network device of claim 1, wherein:
the first auxiliary coding is received as a first set of pulses received substantially immediately before the first data packet; and
the first identifier is encoded in the first set of pulses by varying timing intervals between adjacent pulses in the first set of pulses.

16. The network device of claim 1, wherein the database table is further adapted to store each different identifier corresponding to each set of one or more parameters.

17. The network device of claim 1, wherein the first set of one or more parameters is based on previously performed training results from a previous packet received from the first transmitter.

18. The network device of claim 1, wherein:
the training sequence is independent of the first auxiliary coding; and
the training sequence is independent of the first identifier.

19. The network device of claim 1, wherein:
the first data packet's training sequence is substantially identical to the second data packet's training sequence; and
the first auxiliary coding is not substantially identical to the second auxiliary coding.

20. A method implemented by a network device for a communication network, wherein the network device comprises a database table and a receiver, the method comprising:
(1) storing a first set of one or more parameters in the database table, the first set corresponding a first identifier for a corresponding network device of the communication network;
(2) receiving a first data packet comprising a training sequence, a header and a payload from a first transmitter;
(3) receiving a first auxiliary coding corresponding to only the first data packet, wherein:
the first auxiliary coding identifies the first identifier;
the first auxiliary coding is different from the training sequence; and
the first identifier is different from the training sequence;
(4) recovering the first identifier from the first auxiliary coding;
(5) retrieving the first set of one or more parameters from the database table based on the first identifier;
(6) processing at least a portion of the first data packet based on the first set of one or more parameters;
(7) receiving a second data packet from a second transmitter, the second data packet comprising a training sequence, a header, and a payload;
(8) receiving a second auxiliary coding corresponding to only the second data packet, wherein:
the second auxiliary coding identifies a second identifier;
the second auxiliary coding is different from the second data packet's training sequence;
the second identifier is different from the second data packet's training sequence;
(9) recovering a second set of one or more parameters from the database table based on the second identifier; and
(10) processing at least a portion of the second data packet based on the second set of one or more parameters.

21. The method of claim 20, wherein the communication network is a HomePNA network.

22. The method of claim 20, wherein the first auxiliary coding and the first data packet's training sequence form the first and second portion, respectively, of the first data packet.

23. The method of claim 20, wherein:
the first auxiliary coding is encoded using frequency shift keying (FSK) modulation by frequency division;
the first auxiliary coding is encoded at a frequency different from a frequency for the first data packet;
receipt of the first auxiliary coding overlaps in time with receipt of the training sequence of the first data packet.

24. The method of claim 20, wherein the first auxiliary coding is received before the first data packet is received.

25. The method of claim 20, where the network device further comprises a second transmitter, the method further comprising:

(1) generating a first transmitted auxiliary coding for transmittal with a first transmitted data packet, wherein:
the first transmitted data packet comprises a first transmitted training sequence, a first transmitted header, and a first transmitted payload;
the first transmitted auxiliary coding is different from the first transmitted training sequence;
the first transmitted auxiliary coding identifies a first transmitted identifier;
the first transmitted identifier is different from the first transmitted training sequence;
the first transmitted identifier identifies the second transmitter; and
the first transmitted auxiliary coding is different from the first transmitted training sequence;
(2) transmitting the first transmitted auxiliary coding and the first transmitted data packet to a second network device.

26. The method of claim 25, wherein:
the second transmitter comprises a first RF front end; and
the method comprises transmitting both the first transmitted auxiliary coding and the first transmitted data packet using the first RF front end.

27. The method of claim 25, wherein:
the second transmitter comprises a first RF front end and a second RF front end; and
the method comprises:
transmitting the first transmitted auxiliary coding using the first RF front end; and
transmitting the first transmitted data packet using the second RF front end.

28. The method of claim 20, wherein the first auxiliary coding comprises five or fewer symbols.

29. The method of claim 20, wherein the first auxiliary coding comprises five or fewer bits.

30. The method of claim 20, wherein the first identifier is a station identifier that uniquely identifies the first transmitter within the communication network.

31. The method of claim 30, wherein:
the first data packet header includes a source address for the first transmitter; and
the first identifier is not the same as the source address for the first transmitter.

32. The method of claim 20, wherein the first set of one or more parameters comprises at least one of a receiving-equalizer start value, a timing-recovery start value, an automatic-gain-controller start value, and an echo-canceller start value.

33. The method of claim 20, wherein the first set of one or more parameters is based on moving averages, from past data packets received from the first transmitter, of one or more of a receiving-equalizer value, a timing-recovery value, an automatic-gain-controller value, and an echo-canceller value.

34. The method of claim 20, wherein:
the first auxiliary coding is received as a first set of pulses received substantially immediately before the first data packet; and
the first identifier is encoded in the first set of pulses by varying timing intervals between adjacent pulses in the first set of pulses.

35. The method of claim 20, further comprising storing the first identifier in the database table.

36. The method of claim 20, wherein the first set of one or more parameters is based on previously performed training results from a previous packet received from the first transmitter.

* * * * *